United States Patent
Zarak

(10) Patent No.: US 8,632,715 B2
(45) Date of Patent: Jan. 21, 2014

(54) CONTOURED FLAT MOLD

(75) Inventor: Cesar E. Zarak, Simpsonville, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 389 days.

(21) Appl. No.: 13/061,494

(22) PCT Filed: Aug. 31, 2008

(86) PCT No.: PCT/US2008/074952
§ 371 (c)(1), (2), (4) Date: Feb. 28, 2011

(87) PCT Pub. No.: WO2010/024827
PCT Pub. Date: Mar. 4, 2010

(65) Prior Publication Data
US 2011/0156313 A1   Jun. 30, 2011

(51) Int. Cl.
B27N 3/18 (2006.01)
(52) U.S. Cl.
USPC .......... 264/319; 425/28.1; 425/394; 425/403; 249/101; 156/96; 156/127; 156/129
(58) Field of Classification Search
USPC .......... 264/319; 425/28.1, 394, 403; 249/101; 156/96, 127, 129
See application file for complete search history.

(56) References Cited

U.S. PATENT DOCUMENTS

| 3,901,632 | A |   | 8/1975 | Prosdocimi |
| 4,013,390 | A |   | 3/1977 | Moeller et al. |
| 5,247,151 | A | * | 9/1993 | Hagerman ................. 219/69.17 |
| 5,277,727 | A |   | 1/1994 | Seiler et al. |
| 5,769,975 | A | * | 6/1998 | Keys ......................... 152/209.6 |
| 5,932,153 | A |   | 8/1999 | Keys |
| 6,026,875 | A |   | 2/2000 | Diensthuber et al. |
| 6,408,909 | B1|   | 6/2002 | Nguyen |

(Continued)

FOREIGN PATENT DOCUMENTS

| JP | H10-119054 A | 5/1998 |
| JP | 2001-180228 A | 7/2001 |

(Continued)

OTHER PUBLICATIONS

SU 426859 A1—English translation of specification obtained from McElroy Translation on Aug. 10, 2012, 2 pages.

(Continued)

Primary Examiner — Joseph S Del Sole
Assistant Examiner — David N Brown, II
(74) Attorney, Agent, or Firm — Hahn Loeser & Parks LLP

(57) ABSTRACT

Particular embodiments of the present invention include a contoured tire tread, and a mold and method for forming the contoured tread. In a particular embodiment, a mold is provided for forming a contoured tread, the mold including a first mold member and a second mold member. The first and second mold members are reversibly displaceable from each other from a first, closed position in which the first and second members substantially enclose a mold cavity, to a second open position in which the first and second members are displaced from each other. The first mold member contains a mold cavity adapted to contain a polymeric material and having inner wall members and sipe-forming members. The first mold member having a contoured mold cavity bottom surface, and the second mold member having a contoured molding surface.

20 Claims, 8 Drawing Sheets

(56) References Cited

U.S. PATENT DOCUMENTS

| | | | |
|---|---|---|---|
| 7,201,570 B2 | 4/2007 | Ohara | |
| 7,661,942 B2 | 2/2010 | Nguyen et al. | |
| 8,267,134 B2 * | 9/2012 | Mayni et al. | 152/209.6 |
| 2002/0053380 A1 * | 5/2002 | Oyamada | 152/209.6 |
| 2006/0144491 A1 | 7/2006 | Nguyen et al. | |

FOREIGN PATENT DOCUMENTS

| | | | | |
|---|---|---|---|---|
| SU | 426859 | A1 | | 5/1974 |
| SU | 531481 | A3 | | 10/1976 |
| SU | 585802 | A3 | | 12/1977 |
| WO | WO2008054387 | | * | 5/2008 |

OTHER PUBLICATIONS

Su 585802 A3—English translation of specification obtained from McElroy Translation on Aug. 10, 2012, 3 pages.

PCT/US2008/074952 International Search Report and Written Opinion dated Nov. 24, 2008, 11 pages.

* cited by examiner

CONTOURED FLAT MOLD

BACKGROUND OF THE INVENTION

1. Field of the Invention

This invention relates generally to tire treads and molds, and, more specifically, to contoured tire treads and methods of forming contoured tire treads.

2. Description of the Related Art

The curing of thermoset materials such as rubber (both natural and synthetic) in molds to make elastomeric products such as tires and tire components, including tire treads, is well known. Typically, a material to be cured is placed in a mold and subjected to heat and pressure until a predetermined amount of cross-linking between molecules has been achieved. The cured article is then removed from the mold and subjected to further manipulation, such as trimming of flash from the edges of the article.

A traditional way to manufacture tire treads for retreading is to use a flat mold, wherein the tread is molded in a substantially flat or planar orientation. More specifically, a mold containing relief to form tread features extends longitudinally and laterally in a generally flat (i.e., planar) orientation to form a tread that also extends in a generally planar orientation. When retreading a tire, the tire is typically buffed, an adhesive and/or liaison rubber applied, and then the planar-formed tread is wrapped around the tire carcass. After the joint is "glued" with an adhesive, the tire is then cured in an autoclave to complete the process. The process of wrapping the flat tread onto a round tire causes the tread elements to deform as the previously planar tread is contorted about the curved periphery of the tire carcass. This deformation causes tread features, such as grooves, that run across the tread to open or expand, particularly at the tread contact surface (i.e., the road-contacting side) (see FIG. 1A), upon application to the round tire surface. A tread designer can adjust the tread design to compensate for this increase in size and shape, such as by making the feature, such as a groove, smaller or narrower, so that when it opens during application of the tread to the carcass, the feature or groove deforms or opens to its desired size and shape. Narrower tread features, such as sipes or narrow grooves, however, cannot be made smaller to open to a desired size and shape when the opening deformation is more than the desired thickness of such feature. Sipes are small slits or cuts in the blocks or ribs of a tire, introduced to provide traction edges and/or reduce the rigidity of a block or rib to improve traction and braking in wet or icy conditions or to delay irregular wear patterns. Accordingly, there is a need to provide a contoured tread, as well as means of molding a tread in a substantially flat or planar manner while still being able to obtain the desired dimensions of relatively small tread features, such as sipes.

SUMMARY OF THE INVENTION

Particular embodiments of the present invention include contoured treads, as well as methods and apparatus for forming such treads. Particular embodiments of the present invention include a mold for forming a contoured tread. The mold may include a first mold member and a second mold member, the first and second mold members being reversibly displaceable from each other from a first, closed position in which the first and second members substantially enclose a mold cavity, to a second open position in which the first and second members are displaced from each other. Particular embodiments of the mold may also include the first mold member containing a mold cavity adapted to contain a polymeric material, the mold cavity having a plurality of inner wall members and sipe-forming members for forming tread features. The mold cavity may also include a contoured mold cavity bottom surface. Further, other embodiments, the second mold member includes a contoured molding surface for contacting the polymeric material within the first mold member during a molding operation to form a molded, contoured polymeric material.

Particular embodiments of the present invention include methods of forming a contoured tire tread, such methods including the step of placing a polymeric material within a mold, the mold comprising a first mold member and a second mold member, the first and second mold members being reversibly displaceable from each other from a first, closed position in which the first and second members substantially enclose a mold cavity, to a second open position in which the first and second mold members are displaced from each other, wherein the first mold member contains a mold cavity adapted to contain a polymeric material, the mold cavity having a plurality of inner wall members and sipe-forming members for forming tread features, and a contoured mold cavity bottom surface, and further wherein the second mold member includes a contoured molding surface for contacting the polymeric material within the first mold member during a molding operation to form a molded, contoured polymeric material. Such methods may also include the step of closing the mold by placing the first and second members in the closed position, whereby the polymeric material is distributed within the mold cavity, to provide a molded polymeric material. Further, such methods may also include the step of opening the mold by placing the first and second members in the open position.

Particular embodiments of the present invention include a contoured tread having a longitudinally extending body having a first side having one or more tread features and forming a contact surface side of the tread, and a second side located opposite the first side, the second side forming a tire-attaching bottom surface, wherein the tread features extend within a thickness of the tread extending between the first and second sides of the tread body. The contoured tread also includes a ridge forming a raised portion along the first side and a depression along the second side.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

Particular embodiments of the present invention provide contoured treads, and methods of molding a polymeric material, such as a thermoset or thermoplastic material, in a contoured mold, a contoured mold for a polymeric material, and a contoured tire mold.

A tire tread typically includes a longitudinally and laterally extending body having a thickness containing one or more grooves separating ground-contacting portions of the tread. These ground contacting portions may include blocks (i.e., lugs) or ribs. Ribs generally extend substantially continuously in a longitudinal/lengthwise direction of the tread, and ultimately circumferentially around the tire. Ribs are also bounded by one or more longitudinal grooves. Blocks are essentially ribs that are parsed into smaller portions by lateral grooves. Grooves, whether lateral or longitudinal, are designed to be large (wide) enough to provide a void capable of consuming water, mud, dirt, or any other media associated with the surface upon which the tire operates. Sipes, on the other hand, are much smaller in width, and are often used to create traction edges or to reduce the rigidity of tread blocks or ribs. Sipes are often comparable to providing a slit in the tread. Typically, when a tire engages the ground under load to form a tire footprint, the sipe width is substantially closed or small enough to provide negligible void within the tire footprint. In particular embodiments, sipes have a width (an opening) of approximately 1.2 millimeters (mm) or less. In other embodiments, sipes have a width of 1.0 mm or less. In yet other embodiments, sipes have a width of 0.8 mm or less. In still other embodiments, sipes are less than 0.6 mm wide. The improvements provided by the contoured tread may also benefit other tread features, such as narrow grooves, as well as any other groove. For the sake of clarity, references to "ribs" herein should be understood to include other tread elements such as lugs or blocks, except where the context prevents such an inclusion.

Figure 1A:
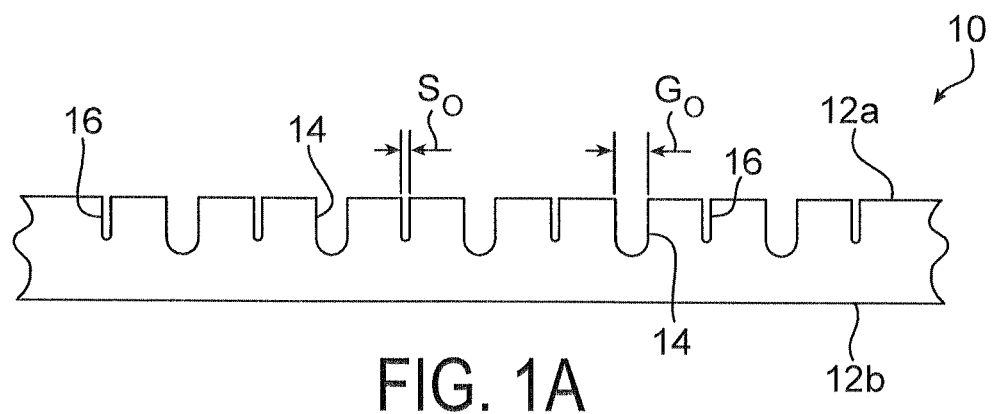
FIG. 1A is a cross-sectional representation of a conventional flat molded tire tread.
Figure 1B:
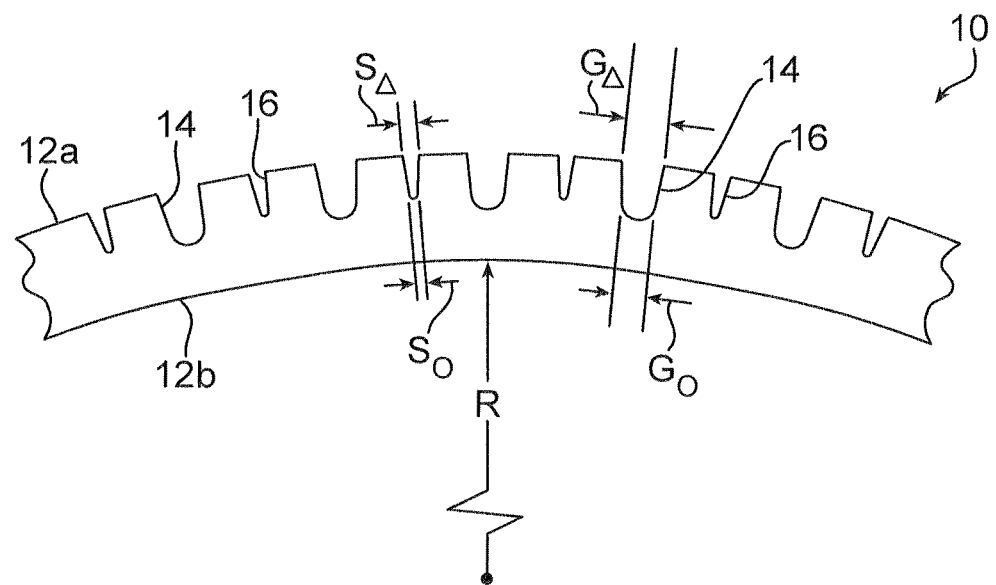
FIG. 1B is a cross-sectional representation the tread of FIG. 1A, which is contorted in a tire-mounted configuration.

As stated above, the process of wrapping a conventional flat tread onto a rounded tire carcass causes the tread, and features thereon, to deform as the flat tread is bent to a curved or rounded shape consistent with the outer periphery of the tire carcass. Of course, the tread side furthest from the tire, or the rotational axis of the tire, most prominently deforms, which is the contact surface side of the tread. With reference to FIG. 1A, a conventional flat-molded tread body 10 is shown, with an exemplary laterally-extending groove 14 having a molded width $G_O$ and laterally-extending sipe 16 having a molded width $S_O$. Laterally-extending, or lateral, means that the referenced feature extends in a direction across the width of the tread (or mold) and relative to a longitudinal direction of the tread (or mold). Such lateral extension (direction) may be normal to the tread (or mold) centerline, or at any other angle relative to the tread (or mold) centerline so long as it extends in a direction across such width. When tread 10 is wrapped about a tire carcass (not shown) having a periphery (or curvature) defined by radius R, as shown in FIG. 1B in an exemplary embodiment, the first side (the contact surface side) 12a of tread 10 expands as it is bent about the tire carcass. Accordingly, lateral groove 14 opens or widens to achieve a groove mounted width $G_A$, while lateral sipe 16 widens to achieve a sipe mounted width $S_A$, where $G_A$ is greater than $G_O$, and $S_A$ is greater than $S_O$. While the resulting deformed shape and size of groove 14 can be altered by changing the molded size and shape of groove 14, such as by narrowing molded groove 14, so that the desired groove width is achieved after the groove 14 opens as the tread 10 is applied to the tire carcass. In other words, the molded tread can be designed such that $G_O$ is less than $G_F$, which is the desired final, mounted groove width. Accordingly, because the desired, mounted width $S_F$ of sipe 16 is much smaller than groove 14, narrowing the molded width $S_O$ of sipe 16 may not be enough to overcome the deflection (opening) of sipe 16 as tread 10 is applied to the tire carcass. Accordingly, the molded sipe width $S_O$ may not be capable of achieving the desired final sipe width $S_F$. It may also be difficult to achieve desired dimensions of other tread features, such as narrow grooves, for example.

Figure 2A:
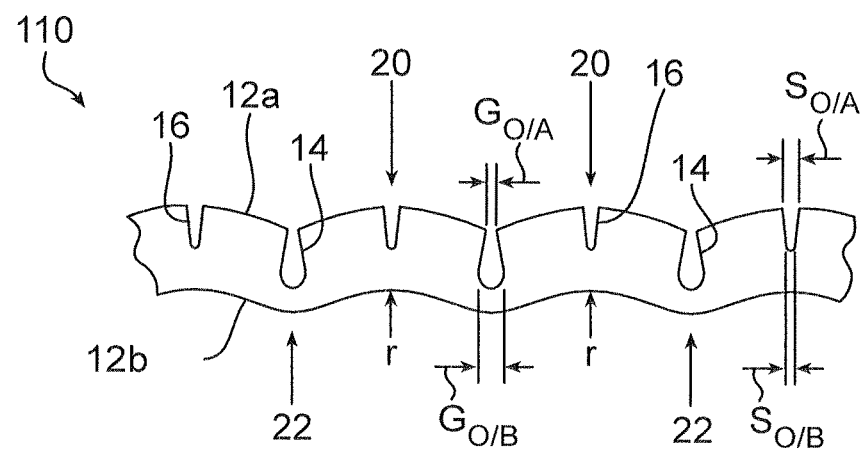
FIG. 2A is a cross-sectional representation of a generally flat tire tread having a contoured profile, according to an embodiment of the invention.

To overcome this problem, a contoured tread may be provided by a corresponding mold. As shown in FIG. 2A, in an exemplary embodiment, a contoured tread 110 is shown. Tread 110 generally comprises a longitudinally extending body having a first side 12a having one or more tread features and forming a contact surface side of the tread 110, and a second side 12b located opposite the first side, the second side forming a tire-attaching bottom surface, wherein the tread features extend within a thickness of the tread extending between the first and second sides of the tread body. In the embodiment shown, tread 110 includes a plurality of ridges 20 associated with laterally-extending tread features. Tread features include grooves 14, which may be wider or narrow, and sipes 16, as well as any other feature desired to be formed within a tread. In the embodiments shown, sipes 16 are associated with ridges 20. A ridge 20 (which extends to a peak furthest from bottom surface 12b) forms a raised portion along the first tread side (contact side) 12a, and a depression along the second tread side (bottom side) 12b. The depression formed by ridge 20 may be defined by a curvature having a radius r. In particular embodiments, such as the one shown in FIG. 2A, a reverse contour extends between adjacent ridges 20 to form a trough 22. Trough 22 forms a recessed portion along top or first side 12a, while forming a raised portion along the bottom or second side 12b. In the embodiment shown in FIG. 2A, a plurality of ridges 20 and troughs 22 are provided and arranged in an alternating ridge-trough arrangement, which can be described as providing an undulating, contoured tread 110.

Figure 2B:
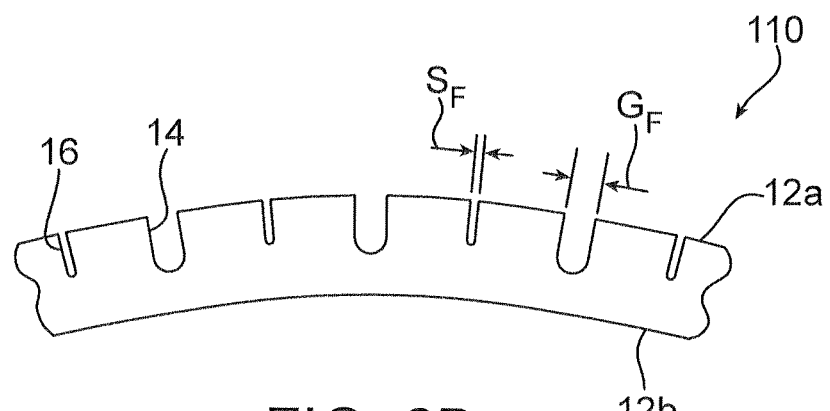
FIG. 2B is a cross-sectional representation of the tread of FIG. 2A, which is contorted in a tire-mounted configuration.

Upon application to a tire carcass, as exemplarily shown in FIG. 2B, tread 110 arcs to form a ring as it adapts to the rounded periphery (or curvature) of the tire carcass, which is defined by radius R (as shown in FIG. 1B). Accordingly, each portion of tread 110 corresponding with ridge 20, in effect, collapses downwardly toward the carcass (or, in other words, trough 22, in effect, is forced outwardly toward ridge 20) to substantially eliminate the ridges 20 and troughs 22, and the undulations formed thereby, to form a ring while engaging the tire carcass (and/or the adhesive interposed there between). It follows that sipes 16 and grooves 14 deform during the application of tread 110 to the tire carcass to achieve their desired widths $S_F$, $G_F$, respectively. In particular embodiments, molding radius r creates an arc along bottom side 12b, the length thereof extending the length of an associated tread block oppositely located above along contact side 12a.

To achieve a desired tread, in particular embodiments, the contoured molding radius r of any ridge 20 is less than the intended carcass mounting radius R, such as is shown in FIGS. 2A and 2B. In this embodiment, a tread feature having an opening located along an associated ridge 20, such as a sipe 16 as shown, will actually decrease in size when tread 110 is applied to the carcass. For example, with continued reference to FIGS. 2A and 2B, a sipe 16 positioned along ridge 20 has an initial molded width $S_{O/A}$ at the top (i.e., open) end and an initial molded width $S_{O/B}$ at the bottom (i.e., closed) end. In the embodiment shown, top molded width $S_{O/A}$ is greater than its final mounted width $S_F$, so that when sipe 16 closes during application of tread 110 to a tire carcass, the sipes 16 reach there target mounted width $S_F$. In other embodiments, molding radius r may be approximately equal to carcass mounting radius R, which means that little deformation will occur along the tread associated with ridge 20 when applied to a tire carcass. Accordingly, top molded width $S_{O/A}$ is approximately equal to final width $S_F$. Approximately means that molding radius r may be slightly larger or smaller than mounting radius R. It is also contemplated that in other embodiments, molding radius r may be larger than the mounting radius R, which still reduces the effects (i.e., the opening of lateral tread features) associated with placing an un-contoured, flat tread onto a tire carcass. As shown, the initial molded bottom width $S_{O/B}$ is less than the initial top width $S_{O/A}$; however, in other embodiments, it is contemplated that bottom width $S_{O/B}$ may be equal to or less than top width $S_{O/A}$. In an exemplary embodiment, mounting radius R is approximately 0.5 meters (m) long plus or minus 5 centimeters; however, longer and shorter mounting radii R are contemplated, since treads 110 may be used on any sized tire or tire carcass. Further, in particular embodiments, sipes 16 may be spaced longitudinally along tread and any contour formed by ridges and/or troughs by 1.5-10 mm, although other spacings, greater or smaller, may be used.

In particular embodiments, as shown in FIGS. 2A and 2B, lateral grooves 14, may be positioned within or along a trough 22. In such instance, the initial molded width $G_{O/A}$ of the top (i.e., open) end of groove 14 may be less than its final mounted width $G_F$, such that when tread 110 is applied to a tire, the groove 14 opens to achieve a target $G_F$. In particular embodiments, an initial molded width $G_{O/B}$ of the bottom (i.e., closed) end may be greater than the initial top width $G_{O/A}$, as shown, even though, in other embodiments, bottom width $G_{O/B}$ may be equal to or less than top width $G_{O/A}$.

Figure 3A:
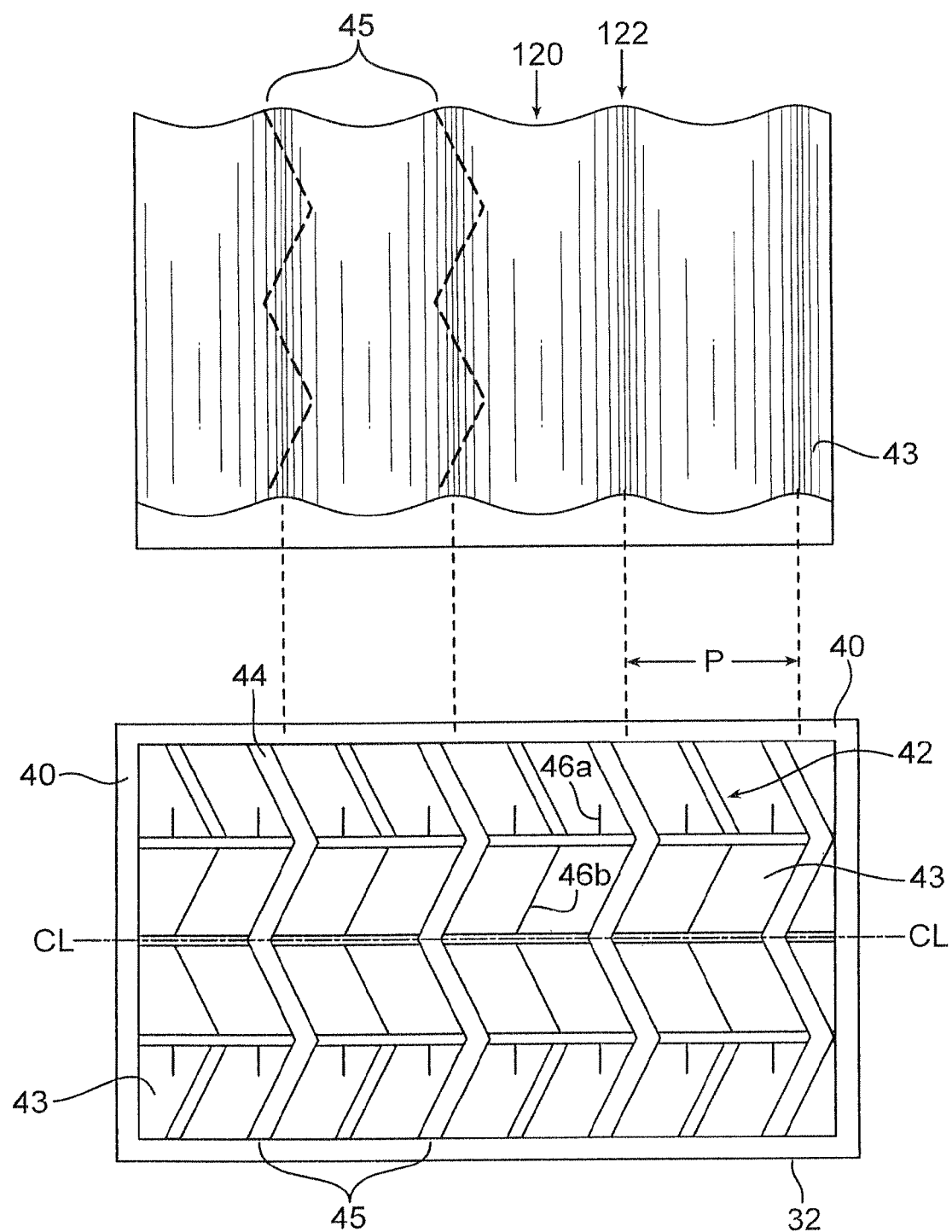
FIG. 3A is a top perspective view of a first mold member of a contoured tire tread mold shown in association with a figure representing a contoured bottom surface of a molding cavity of the first mold member, in accordance with an embodiment of the invention.
Figure 3B:
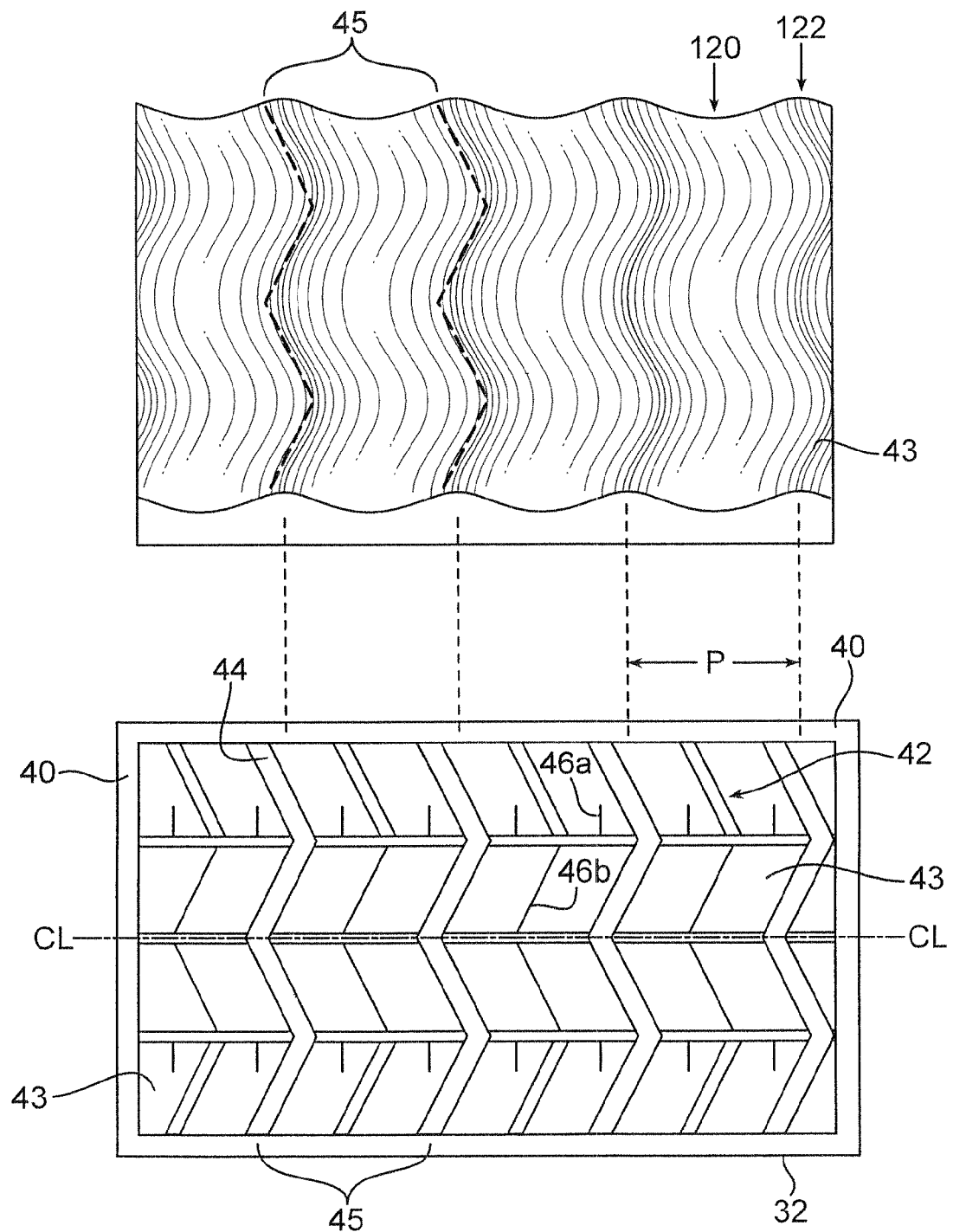
FIG. 3B is a top perspective view of a first mold member of a contoured tire tread mold shown in association with a figure representing a contoured bottom surface of a molding cavity of the first mold member, in accordance with an alternative embodiment of the invention.

As previously stated, it may be desirous to position sipes 16 or other desired tread features (such as narrow grooves) along ridge 20. It is contemplated that any tread feature, such as sipe 16, while positioned on a ridge 20, may extend in the same direction in which ridge 20 extends, that is, a tread feature may extend in parallel or coaxial alignment with the extension of ridge 20. It is also completed that any such feature, such as sipe 16, may extend across ridge 20, in a direction transverse to the path along which ridge 20 extends. For example, with regard to FIG. 3A, sipes formed in association with sipe-forming members 46a of first mold member 32 would extend in the same direction as an associated ridge formed by ridge-forming portion 120. Similarly, in FIG. 3B, sipes formed in association with sipe-forming members 46b of first mold member 32 would extend in the same direction as an associated ridge formed by ridge-forming portion 120, as member 46b would extend along a similarly extending segment of the zig-zagging portion 120. In FIG. 3A, however, sipes formed in association with sipe-forming members 46b would traverse a ridge formed by ridge-forming portion 120. The same would be true for a sipe formed in association with sipe-forming member 46a in FIG. 3B. FIGS. 3A and 3B independently show a contoured cavity bottom surface 43 in association with a first mold member 32 in which the surface 43 is contained. Such figures also show a tread pattern segment 45, of cavity 42 in first mold member 32, superimposed upon the independent representation of the contoured bottom surface 43, which shows the alignment of segment 45 and its tread features relative to the ridge and trough-forming portions 120, 122 of contoured bottom surface 43.

Figure 9:
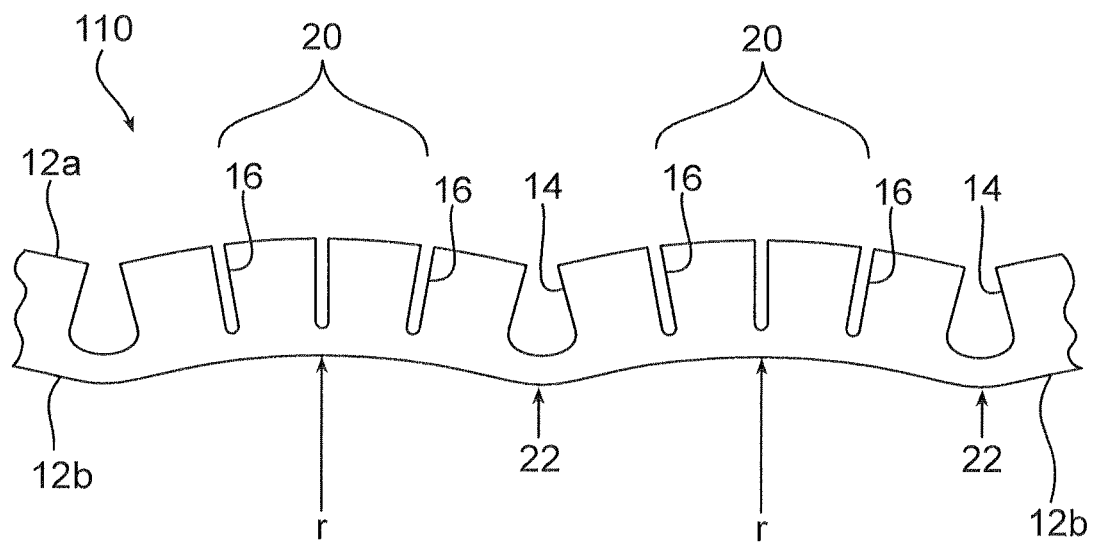
FIG. 9 is a cross-sectional representation of a generally flat tire tread having a contoured profile, according to an alternative embodiment of the invention.

Although grooves 14 are shown in association with troughs 22, it is contemplated that grooves 14 can be located to either side of the reverse (transition) radius between ridges 20, and along a side or peak of ridge 20, when the mold design of any such groove can compensate for the deflection achieved during tread application to a tire carcass. Similarly, sipes 16 can be located along any portion of ridge 20. For example, as shown in FIG. 2A, sipes 16 are located at the peak of each ridge 20, while in FIG. 9, a sipe 16 is located at the peak of each ridge 20 with adjacent sipes 16 located on either side thereof along a side of each ridge 20. Sipes 16 may also extend linearly, arcuately, or in a zig-zag or stepped path. Further, the cross-sectional shape of any sipe 16 may form any of a variety of geometries or shapes. Accordingly, sipe 16 may comprise any sipe within the art of tires.

To form a contoured tread 110, a contoured mold 30 may be used to first form tread elements into a curved shape, such that the opening of the tread elements or features is controlled when the tread is applied to a round tire carcass. For some features, including transverse features such as grooves and sipes, the opening is reduced, eliminated, or caused to close even further. Other features, such as wider grooves between tread blocks may open more, but this can be considered and compensated for in the design of the tread pattern. With these considerations in mind, in a contoured mold, individual tread elements and features are molded with an associated curvature provided at least along the tread bottom side (the tire-attaching surface side), and, in particular embodiments, also along the top side (the contact surface side), of the tread mold. The tread, however, is aligned generally flat overall so it can be molded in the traditional flat-mold presses. Particular embodiments of the contoured mold include methods and apparatus for molding a tire tread.

Accordingly, particular embodiments of the present invention include a mold for forming a contoured tread. Embodiments of such mold may include a first mold member and a second mold member, the first and second mold members being reversibly displaceable from each other from a first, closed position in which the first and second members substantially enclose a mold cavity, to a second open position in which the first and second members are displaced from each other. In a first, closed position, the first and second members cooperate to close the mold and substantially enclose a mold cavity and in a second, open position, the first and second members are displaced from each other and the mold is in an open configuration. The first mold member contains a mold cavity for forming tread elements and features for engaging a road or ground surface. When a material to be molded is placed in the mold and the mold is then closed, the material at least partially fills a mold cavity formed between the mold portion of the first mold member and the second mold member, and overflows the walls of the mold cavity to form "flash" which seals the material in the mold cavity. The first and second mold members may be placed directly or indirectly on platens for receiving heat and/or pressure to mold the polymeric material and, in the case of thermoset polymers, to create crosslinks in the polymeric material to provide an at least partially cured material.

Particular embodiments of such mold may also include the first mold member containing a mold cavity adapted to contain a polymeric material, the mold cavity having a plurality of inner wall members and sipe-forming members for forming tread features, and a contoured mold cavity bottom surface. Further embodiments include the contour of the mold cavity bottom surface of the first mold member being associated with the contour of the second mold member molding surface.

Particular embodiments of the mold also provide the second mold member having a contoured molding surface for contacting the polymeric material within the first mold member during a molding operation to form a molded, contoured polymeric material. Further embodiments provide that the contoured molding cavity bottom surface and the contoured molding surface of the second mold member are undulating surfaces. It is further contemplated that, in particular embodiments, each of the contoured molding cavity bottom surface and the contoured molding surface of the second mold member include one or more ridge-forming portions and trough-forming portions. In particular embodiments, one or more sipes-forming members are positioned along one or more of the ridge-forming portions. Further, it is contemplated that at least one of the inner wall members is positioned along one or more of the trough-forming portions, the at least one of the inner wall members being sized and shaped to form a lateral groove in the tread material.

Figure 4:
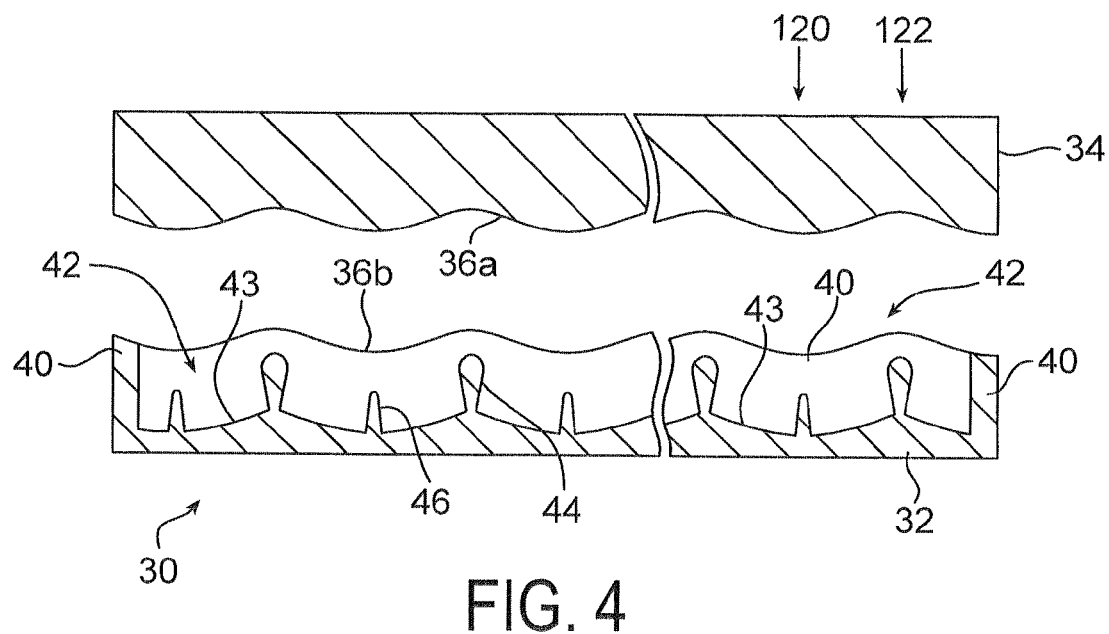
FIG. 4 is a side cross-sectional view of contoured mold comprising a first and second mold members, in accordance with an embodiment of the present invention.
Figure 5:
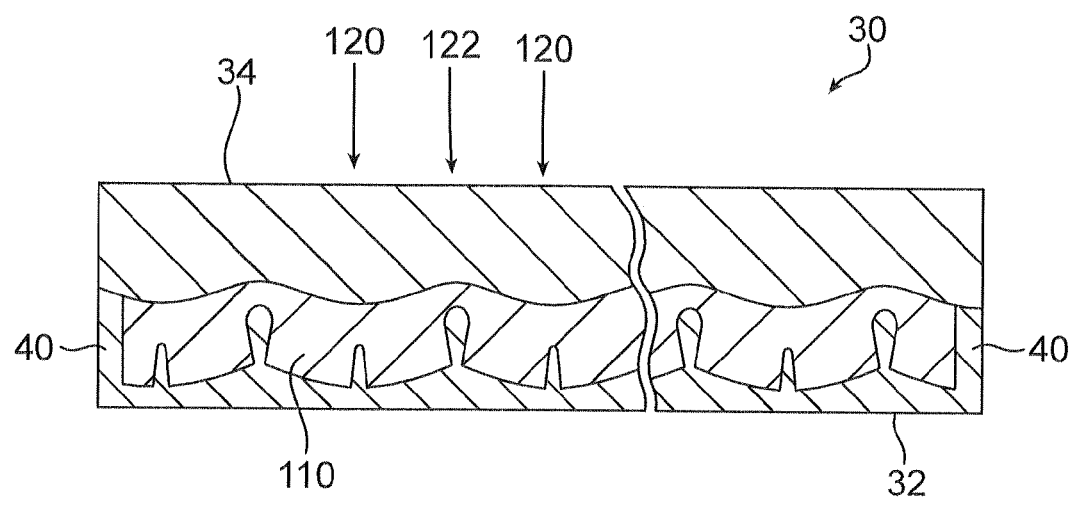
FIG. 5 is a cross-sectional view of the contoured mold of FIG. 4 shown in use, the mold including first and second mold members in a closed mold configuration with a polymeric material, in accordance with an embodiment of the invention.

With reference to FIGS. 3-5, a contoured mold 30 is shown in an exemplary embodiment. Accordingly, contoured mold 30 includes a first mold member 32 and a second mold member 34. First mold member 32 may be placed upon a bottom platen (not shown), which supplies heat for curing the material being molded (and in some embodiments, cured), such as a thermoset or thermoplastic material. As shown in FIGS. 3A-3B, first mold member 32 is bounded by a plurality of outer walls 40 enclosing a molding cavity 42 having a width and a length, the cavity width being associated with the lateral extent of a tread 110, and the cavity length being associated with a longitudinal length of tread 110 for extension about a circumference of a tire. Molding cavity 42 contains a one or more inner wall members 44 that together to define a tread pattern, in negative relief. Additionally, cavity 42 also contains one or more sipe-forming members 46. Sipe-forming members 46, as well as inner wall members 44 (which may operate as groove-forming members, i.e., to form grooves 14), may comprise any of a number of geometries and orientations. Accordingly, any known sipe or groove design may be achieved, which may include, for example, rectilinear, curved, and variable height and/or thickness configurations. Sipe-forming members 46 are sized to achieve the desired sipe thicknesses discussed above, in particular embodiments.

A method of molding a polymeric material with a contoured mold as provided by the invention may be described with reference to FIGS. 4-5. The polymeric material may be a thermoset or thermoplastic material. Thermoset materials include natural and synthetic rubber, such as polymers and co-polymers of butadiene and/or isoprene. Thermoplastic materials include polymers such polyesters, polycarbonates and the like. FIG. 4 shows a cross-sectional side view of a contoured mold 30 including first mold member 32 and second mold member 34 in an open configuration of the mold, that is, with first mold member 32 and second mold member 34 displaced from each other. A polymeric material to be molded is placed in molding cavity 42 in an amount sufficient that when first and second mold members 32, 34 are moved to a closed position as shown in FIG. 5, the material occupies a predetermined portion of molding cavity 42. An amount of excess material may escape from molding cavity 42 to form a seal between first mold member 32 and second mold member 34. This portion of material is referred to as "flash."

It is contemplated that any contoured tread design may be formed by a contoured mold as described herein. Accordingly, at least a portion of the tread pattern of molding cavity 42 may extend along a contour along cavity bottom surface 43. More specifically, portions of the tread pattern formed by members 44, 46 within cavity 42 may be arranged in association with ridge and trough-forming portions 120, 122, respectively, which may form contours along cavity bottom surface 43 and molding surface 36a to achieve a contoured tread 110 having a desired arrangement of features. Contoured molding surface 36a of second mold member 34 is shown having ridge and trough-forming portions 120, 122 in FIGS. 4-5, and 8, in exemplary embodiments. The contours of cavity bottom surface 43 and of molding surface 36a may be substantially similar in particular embodiments (such as is shown in FIGS. 4-5), or may be deviate from each other in other embodiments while still providing a contoured tread 110. It follows that the corresponding contours of tread sides 12a and 12b may also the same or different.

It is contemplated, in particular embodiments, that the perimeter of first mold member 32 is formed by sides 40. Further, more specific embodiments, such as shown in FIG. 4, include longitudinal sides 40 having a contour 36b similar to contoured molding surface 36a for engaging second member 34 when mold 30 is in a substantially closed position. A substantially closed position contemplates that tread flash may be interposed between first and second mold members 32, 34.

After the material has been molded and/or cured a predetermined amount and it is desired to remove the molded and/or at least partially cured material from contoured mold 30, first mold member 32 and second mold member 34 are separated and returned to an open configuration, thereby opening mold 30. Accordingly, mold 30 provides a molded polymeric article, such as a tire tread 110, which includes a corresponding contour extending along the length of the article or tread 110 when the overall orientation of the molded tread or article is more generally flat or planar. In particular embodiments, the molded article has a first side 12a that operates as the contact surface side of tread 110, which is configured for contacting the ground or road surface, and a second side 12b which operates as a tire-attaching bottom surface configured for attaching tread 110 to a tire carcass (not shown). Grooves 14 and sipes 16 will also be provided as discussed above in association with FIGS. 2A and 2B.

Figure 8:
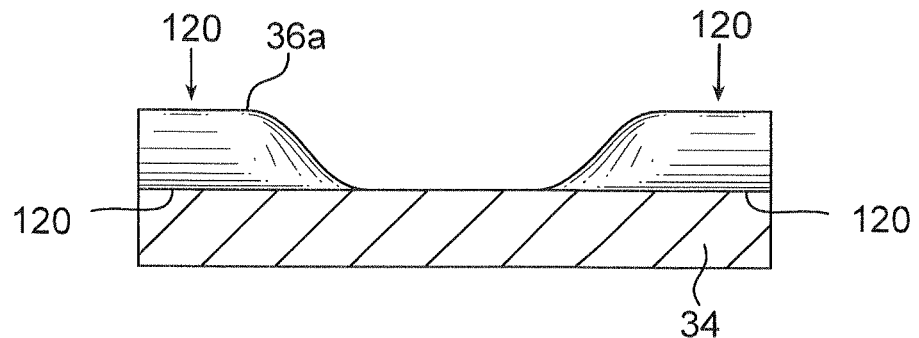
FIG. 8 is a sectional end view of a second mold member showing a discontinuous ridge-forming members extending in a lateral direction along a molding surface of the second mold member, in accordance with an alternative embodiment of the invention.

As discussed herein, a tread may be contoured to achieve desired tread feature dimensions when such flat contoured tread is placed along a round tire carcass. Accordingly, laterally-extending ridges 20 and troughs 22 may be arranged along a tread, and accompanying formations similarly arranged within a mold to achieve the desired tread design and features. With reference to FIGS. 3A and 3B, a tread design formed within a cavity 42 of first mold member 32 is shown. Further, an independent representation of the contoured bottom surface 43 of each such first mold member 32 is also shown above and in relation to the tread pattern contained within mold cavity 42. This is done to more clearly show the association between the bottom surface contours and the features of the tread design. As discussed previously, first mold member 32 includes a mold cavity 42, which has a contoured bottom surface 43. As shown, the contours of each bottom surface 43 and molding surface 36a may be formed by ridge-forming portions 120 and trough-forming portions 122. Each portion 120, 122 may be aligned with any particular tread features within mold cavity 42, to provide any desired tread. Molding surface 36a of the second mold member 34 may also contain ridge-forming portions 120 and trough-forming portions 122, as generally shown in FIGS. 4-5 and 8. The ridge and trough-forming portions 120, 122 shown in FIGS. 3A-3B may also extend laterally along molding surface 36a.

In particular embodiments, a tread is comprises of a plurality of segments 45 spaced along the tread length. Accordingly, a ridge 20 and/or trough 22 may be arranged in association with each tread segment 45 to facilitate proper alignment with desired tread features. With reference to FIGS. 3A and 3B, tread designs and features are defined and arranged in mold cavity 42 of first mold member 32. In these exemplary embodiments, ridge-forming portions 120 and trough-forming portions 122, representing ridges 20 and troughs 22, respectively, are shown aligned with portions of the tread pattern in cavity 42. As shown, sipes 46a, 46b of each segment 45 are positioned or aligned along ridge-forming portions 120, while the inner walls 44 associated with lateral grooves 14 are positioned in part along trough-forming portions 122. As shown, it is contemplated that each ridge 20 and trough 22 may be repeated with each tread segment 45. Or, in other words, tread segments 45 may be positioned along, or associated with, ridge and trough-forming portions 120, 122 as desired. In the figures, the perimeter of a segment 45 is superimposed upon a corresponding portion of the independently shown cavity bottom surface 43 to more clearly show how the inner walls 44 and sipe-forming members 46 are associated with contoured bottom surface 43. It is contemplated that any tread design, as well as any corresponding mold cavity 42, may include a contoured cavity bottom surface 43 providing any association with the tread design as desired. Accordingly, it is contemplated that the location and spacing of sipes 16 and other tread features of concern may vary between tread designs.

Figure 6:
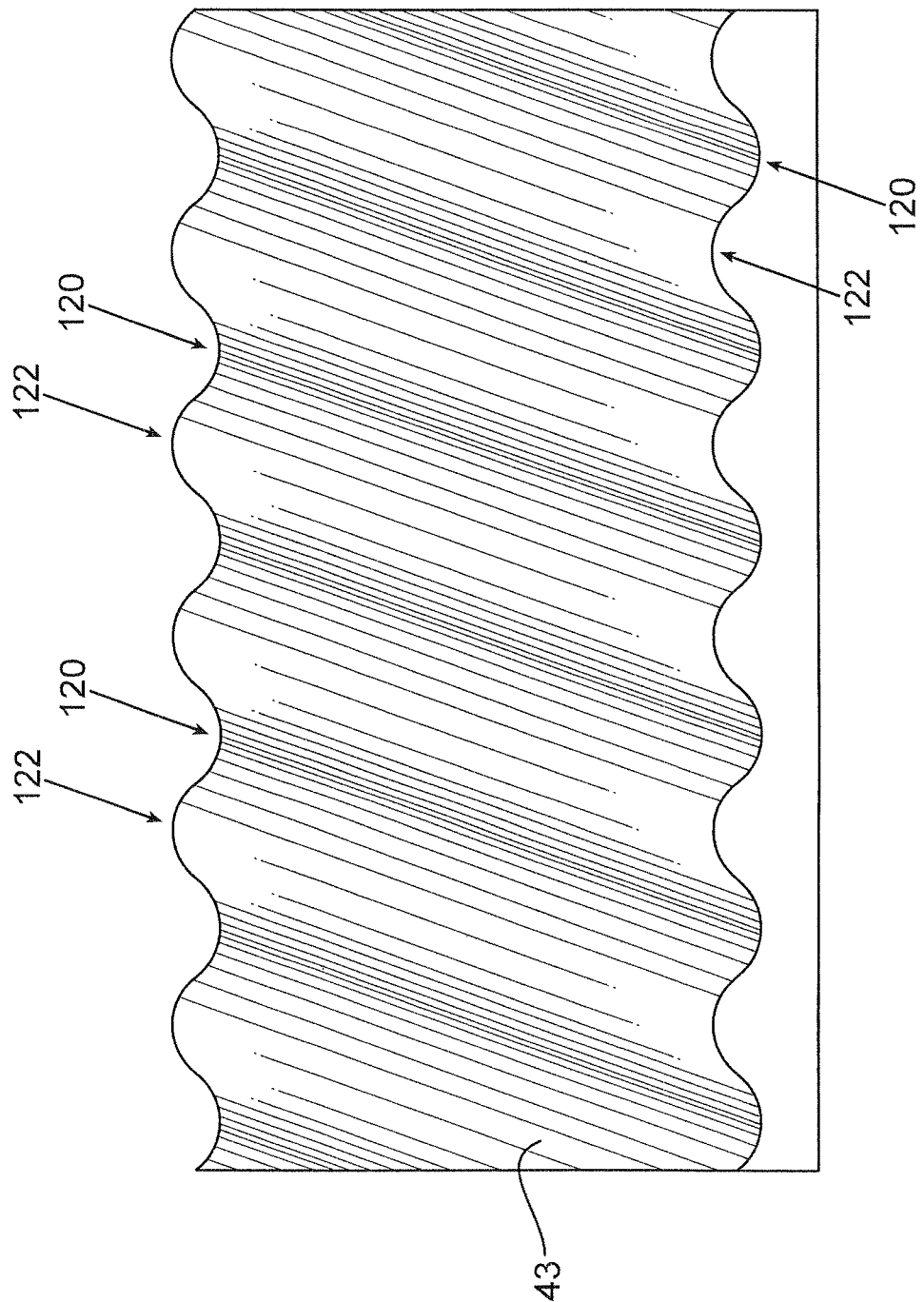
FIG. 6 is a top perspective view of an alternative embodiment of the contoured molding cavity bottom surface shown in FIGS. 3A and 3B, which shows a plurality of linear ridges extending in a laterally-biased orientation, in accordance with an embodiment of the invention.
Figure 7:
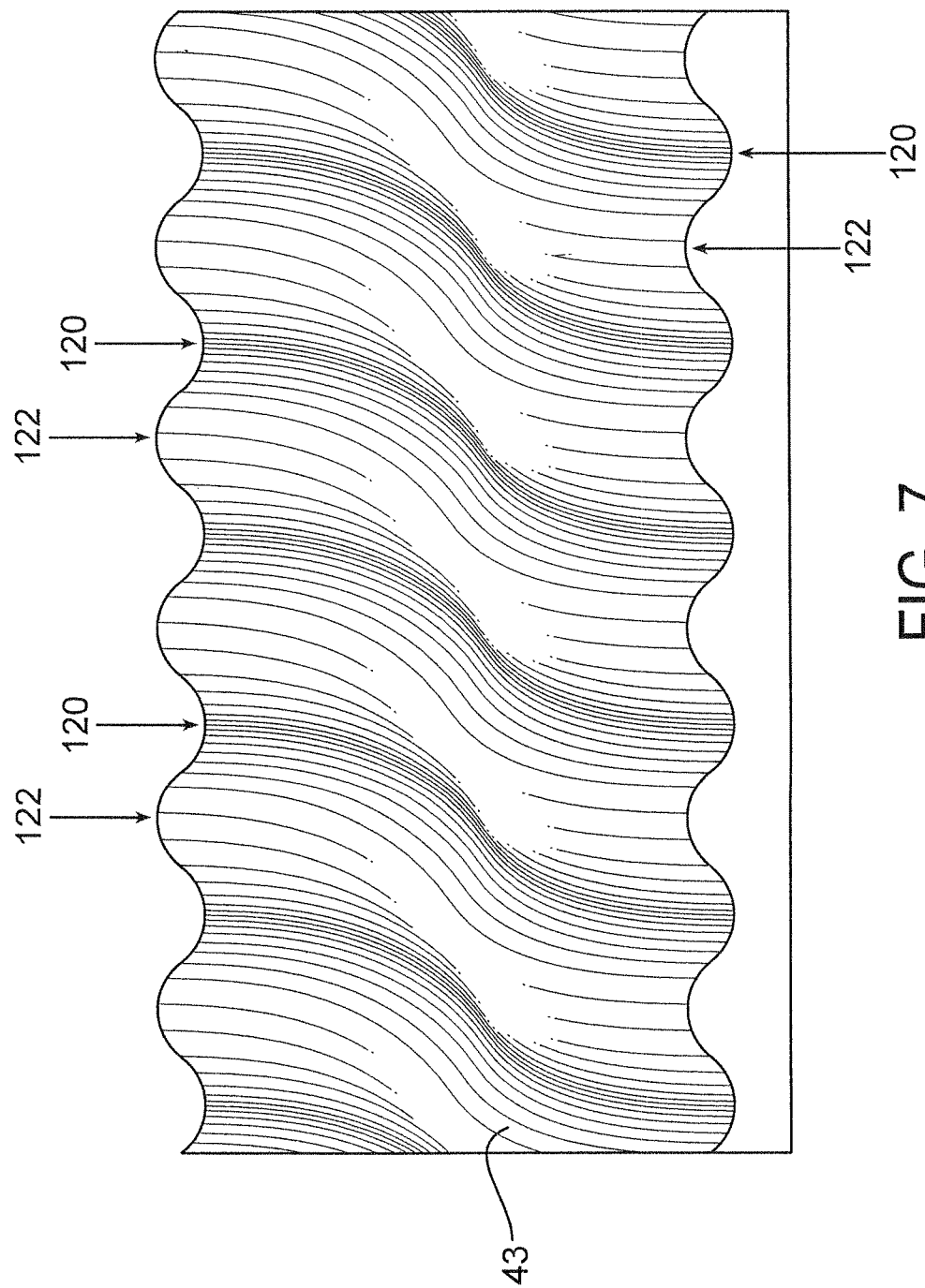
FIG. 7 is a top perspective view of an alternative embodiment of the contoured molding cavity bottom surface shown in FIGS. 3A, 3B, and 6, which shows a plurality of non-linear ridges extending in a laterally-biased orientation, in accordance with an embodiment of the invention.

The contours discussed herein may comprise any shaped contour, which may include symmetric, asymmetric, variable, or constant contour. Particular contours are shown in FIGS. 3A-3B along cavity bottom surface 43, which are symmetrical about a vertical plane extending laterally across the mold (or tread) and normal to both the mold (or tread) centerline and the exterior flat bottom of first mold member 32 (i.e., the longitudinal direction of mold/tread); however, the contour is not symmetrical about a normal plane extending both laterally and longitudinally along the mold (or tread). In other embodiments shown in FIGS. 6-7, showing alternative embodiments of the independently represented contoured cavity bottom surface 43 of FIGS. 3A-3B, a sinusoidal contour is shown, which is symmetrical about both vertical and longitudinal normal planes (described in the previous sentence). In any embodiment, the amplitude (i.e., height) of any contour (or wave) may increase or decrease in a longitudinal and/or lateral direction of the tread to provide a variable contour. Further, in any embodiment, the pitch length P between adjacent troughs 22 or ridges 20 may consistently repeat, or vary as desired, along the length of tread 110 (and corresponding mold 30). In an exemplary embodiment, pitch length P is 2-4 inches, and yet another embodiment between 4-10 mm; however, short and longer pitch lengths may be used.

Contours associated with tread 110, as well as first and second mold members 32, 34, respectively, may extend laterally in any direction or path. More specifically, ridges 20 and/or troughs 34, as well as associated ridge and trough-forming portions 120, 122 extending along cavity bottom surface 43 and molding surface 36a, respectively, may extend laterally in any direction and in any manner. As shown, for example, in the embodiment of FIG. 3A, ridge and trough-forming portions 120, 122, which also represent ridges 20 and troughs 22 of a tread, extend linearly in a lateral direction normal to a tread centerline CL, while the embodiment of FIGS. 3B and 7 provide ridge and trough-forming portions 120, 122 extending laterally in a non-linear direction. With reference to FIG. 6, ridge and trough-forming portions 120, 122 extend laterally at a bias (non-normal angle) across the width of tread 110. Further, with regard to FIG. 8, ridge-forming portion 120 (but also any trough-forming portion 122 in other embodiments) may be a laterally discontinuous (i.e., a ridge or trough may not extend entirely across the tread width of tread 110, but instead extend in one or more segments). Accordingly, ridges 20 and troughs 22, as well as ridge and trough-forming portions 120, 122 may be arranged in any orientation to accommodate the features of any desired tread pattern.

Accordingly, particular embodiments of the present invention include a method of forming a contoured tire tread. In particular embodiments, such methods may include the step of placing a polymeric material within a mold, the mold comprising a first mold member and a second mold member, the first and second mold members being reversibly displaceable from each other from a first, closed position in which the first and second members substantially enclose a mold cavity, to a second open position in which the first and second mold members are displaced from each other, wherein the first mold member contains a mold cavity adapted to contain a polymeric material, the mold cavity having a plurality of inner wall members and sipe-forming members for forming tread features, and a contoured mold cavity bottom surface, and further wherein the second mold member includes a contoured molding surface for contacting the polymeric material within the first mold member during a molding operation to form a molded, contoured polymeric material. Other steps of such methods may include closing the mold by placing the first and second members in the closed position, whereby the polymeric material is distributed within the mold cavity, to provide a molded polymeric material, and opening the mold by placing the first and second members in the open position.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. A mold for forming a contoured tire tread, the mold comprising:
   a first mold member and a second mold member each extending longitudinally between opposing ends and laterally between opposing sides, the first and second mold members being reversibly displaceable from each other from a first, closed position in which the first and second members substantially enclose a mold cavity to a second, open position in which the first and second members are displaced from each other, the mold cavity extending longitudinally and laterally along the first and second mold members and having a thickness bounded by opposing first and second sides of the mold cavity each respectively associated with one of the first and second mold members and each configured to form one of a top side or bottom side of a molded tread, the top and bottom sides being spaced apart to form a total thickness of the molded tread, each of the first and second sides undulating with the total tread thickness of the mold cavity in the longitudinal direction of the mold cavity, where each of the first and second sides includes at least one ridge-forming portion and/or trough-forming portion each configured to form a respective ridge or trough along a corresponding top or bottom side of the molded tread,
   wherein the first mold member includes a plurality of inner wall members configured to form tread features within a thickness of the molded tire tread, the inner wall members extending into the total thickness of the mold cavity from the first side of the mold cavity.

2. The mold of claim 1, wherein each of the first and second sides includes a plurality of ridge-forming portions and/or trough-forming portions configured to form a plurality of ridges and/or a plurality of troughs extending laterally across the molded tread, such that each of the trough-forming portions arranged along one of the first and second sides is spaced opposite one of the ridge-forming portions relative the mold cavity thickness.

3. The mold of claim 1, wherein one or more sipe-forming members are positioned along one or more of the ridge-forming portions and configured to form a sipe in the molded tread, where a molded width of the sipe is configured to narrow when the molded tread is installed upon a tire carcass.

4. The mold of claim 1, wherein at least one of the inner wall members is positioned along one or more of the trough-forming portions, the at least one of the inner wall members being sized and shaped to form a lateral groove in the molded tire tread, where a molded width of the lateral groove is configured to increase when the molded tread is installed upon a tire carcass.

5. A method of forming a contoured tire tread, the method comprising:
   placing a polymeric material within a mold, the mold comprising a first mold member and a second mold member each extending longitudinally between opposing ends and laterally between opposing sides, the first and second mold members being reversibly displaceable from each other from a first, closed position in which the first and second members substantially enclose a mold cavity to a second open position in which the first and second mold members are displaced from each other, the mold cavity extending longitudinally and laterally along the first and second mold members and having a thickness bounded by opposing first and second sides of the mold cavity each respectively associated with one of the first and second mold members and each configured to form one of a top side or bottom side of a molded tread, the top and bottom sides being spaced apart to form a total thickness of the molded tread, each of the first and second sides undulating with the total tread thickness of the mold cavity in the longitudinal direction of the mold cavity, where each of the first and second sides includes at least one ridge-forming portion and/or trough-forming portion each configured to form a respective ridge or trough along a corresponding top or bottom side of the molded tread, wherein the first mold member includes a plurality of inner wall members configured to form tread features within a thickness of the molded tire tread, the inner wall members extending into the total thickness of the mold cavity from the first side of the mold cavity;
   closing the mold by placing the first and second members in the closed position, whereby the polymeric material is distributed within the mold cavity to form the molded tire tread;
   opening the mold by placing the first and second members in the open position.

6. The method of claim 5, wherein each of the first and second sides includes a plurality of ridge-forming portions and/or trough-forming portions configured to form a plurality of ridges and/or a plurality of troughs extending laterally across the molded tread, such that each of the trough-forming portions arranged along one of the first and second sides is spaced opposite one of the ridge-forming portions relative the mold cavity thickness.

7. The method of claim 5, wherein one or more sipe-forming members are positioned along one or more of the ridge-forming portions and configured to form a sipe in the molded tread, where a molded width of the sipe is configured to narrow when the molded tread is installed upon a tire carcass.

8. The method of claim 5, wherein at least one of the inner wall members is positioned along one or more of the troughs-forming portions, the at least one of the inner wall members being sized and shaped to form a lateral groove in the molded tire tread, where a molded width of the lateral groove is configured to increase when the molded tread is installed upon a tire carcass.

9. The method of claim 5, wherein the molded tire tread comprises:
   a longitudinally extending body having the top side, which includes one or more tread features extending into the total tread thickness from the top side and comprises a road-contacting side of the tread, and the bottom side located opposite the top side relative the total thickness of the tread, the bottom side including a tire-attaching bottom surface;
   a ridge extending in a lateral direction of the tread body and forming a raised portion along the top side and a depression along the bottom side of the tread body opposite the raised portion.

10. The method of claim 9 further comprising:
    a trough extending in the lateral direction of the tread body and forming a depression along the top side and a raised portion along the bottom side of the tread body opposite the depression, the trough being spaced from the ridge in a longitudinal direction of the body.

11. The method of claim 10, wherein a plurality of ridges and troughs are provided and arranged in an alternating ridge-trough arrangement along each of the first and second sides of the tread in the longitudinal direction of the tread body.

12. The method of claim 9, wherein the one or more tread features include one or more lateral sipes, the one or more lateral sipes being positioned along the ridge.

13. The method of claim 9, wherein the one or more tread features includes one or more lateral grooves, the one or more lateral grooves being positioned along the recess.

14. The method of claim 9, wherein the ridge extends laterally in a direction substantially normal to a tread centerline extending in the longitudinal direction of the tread body.

15. The method of claim 9, wherein the ridge extends nonlinearly in a lateral direction of the tread body.

16. The mold of claim 1, wherein the ridge-forming portion and/or the trough-forming portion extends nonlinearly in a lateral direction of the tread body.

17. The mold of claim 1, wherein each trough-forming portion arranged along one of the first and second sides is spaced opposite one of the ridge-forming portions relative the mold cavity thickness such that a depression is arranged opposite the ridge formed by the ridge-forming portion within the total thickness of the mold cavity.

18. The method of claim 10, wherein the depression located opposite the ridge is defined by a contour having a radius less than a radius of the depression when installed upon a tire carcass.

19. The mold of claim 2, wherein each of the first and second sides includes a plurality of ridge-forming portions and a plurality of trough-forming portions to form a plurality of ridges and a plurality of troughs extending laterally across the molded tread along each of the top and bottom sides of the molded tread, such that each of the trough-forming portions arranged along one of the first and second sides is spaced opposite one of the ridge-forming portions relative the mold cavity thickness.

20. The method of claim 6, wherein each of the first and second sides includes a plurality of ridge-forming portions and a plurality of trough-forming portions to form a plurality of ridges and a plurality of troughs extending laterally across the molded tread along each of the top and bottom sides of the molded tread, such that each of the trough-forming portions arranged along one of the first and second sides is spaced opposite one of the ridge-forming portions relative the mold cavity thickness.

* * * * *